United States Patent
Huang et al.

(10) Patent No.: US 10,896,618 B2
(45) Date of Patent: Jan. 19, 2021

(54) SYSTEM AND METHOD FOR DETERMINING DIVERSION AIRPORTS FOR LANDING IN ADVERSE CONDITIONS

(71) Applicant: HONEYWELL INTERNATIONAL INC., Morris Plains, NJ (US)

(72) Inventors: Jinming Huang, Beijing (CN); Haiming Wang, Beijing (CN); Kenneth R. Jongsma, Tijeras, NM (US)

(73) Assignee: Honeywell International Inc., Charlotte, NC (US)

( * ) Notice: Subject to any disclaimer, the term of this patent is extended or adjusted under 35 U.S.C. 154(b) by 379 days.

(21) Appl. No.: 15/585,286

(22) Filed: May 3, 2017

(65) Prior Publication Data

US 2018/0322793 A1  Nov. 8, 2018

(51) Int. Cl.
  *G08G 5/00* (2006.01)
  *H04B 7/185* (2006.01)
(52) U.S. Cl.
  CPC ......... *G08G 5/0039* (2013.01); *G08G 5/0013* (2013.01); *G08G 5/0026* (2013.01); *G08G 5/0091* (2013.01); *H04B 7/18506* (2013.01)
(58) Field of Classification Search
  None
  See application file for complete search history.

(56) References Cited

U.S. PATENT DOCUMENTS 5,526,265 A  6/1996 Nakhla
5,842,142 A  11/1998 Murray et al.
(Continued)

FOREIGN PATENT DOCUMENTS

| EP | 2575122 A2 | 4/2013 |
|---|---|---|
| EP | 3154047 A1 | 12/2014 |
| WO | 0208922 A1 | 1/2002 |

OTHER PUBLICATIONS

Fabbian, D. et al; Application of Artificial Neural Network Forecasts to Predict Fog at Canberra International Airport; Journals Online; Nov. 29, 2016; vol. 22, No. 2.
(Continued)

*Primary Examiner* — Todd Melton
*Assistant Examiner* — Jason R Roberson
(74) *Attorney, Agent, or Firm* — Bookoff McAndrews, PLLC

(57) ABSTRACT

Systems and methods are provided for determining diversion airports for landing an aircraft in adverse conditions. A communication device is configured to facilitate the transmission and display of flight information. A ground based monitoring server (GBMS) communicates with the aircraft over a wireless communication channel. The GBMS has a diversion landing prediction assistance system (DLPAS) that communicates with and queries an aircraft flight parameter database, an airport parameter database, and an airport weather database. The DLPAS monitors parameters from the databases, determines a destination probability of the aircraft to land at the destination airport based on the monitored parameters, and, when the destination probability for a successful landing is less than a predetermined destination threshold, selects a diversion airport to land the aircraft. The GBMS transmits the selected diversion airport to the aircraft.

20 Claims, 3 Drawing Sheets

(56) References Cited

U.S. PATENT DOCUMENTS

| | | | |
|---|---|---|---|
| 7,437,225 B1 | 10/2008 | Rathinam | |
| 7,720,630 B1 | 5/2010 | Miller et al. | |
| 8,214,136 B2 | 7/2012 | Caillaud | |
| 8,565,944 B1* | 10/2013 | Gershzohn | G08G 5/0039 |
| | | | 701/1 |
| 8,666,649 B2 | 3/2014 | Otto et al. | |
| 8,723,686 B1 | 5/2014 | Murray et al. | |
| 9,076,327 B1 | 7/2015 | Baiada et al. | |
| 2009/0171560 A1 | 7/2009 | McFerran et al. | |
| 2010/0161153 A1 | 6/2010 | Corfman | |
| 2010/0161156 A1 | 6/2010 | Coulmeau et al. | |
| 2011/0246002 A1* | 10/2011 | Shavit | G08G 5/0026 |
| | | | 701/14 |
| 2014/0247163 A1 | 9/2014 | Kommuri et al. | |
| 2015/0317904 A1 | 11/2015 | Agarwal et al. | |
| 2016/0229554 A1 | 8/2016 | Kawalkar et al. | |
| 2017/0345318 A1* | 11/2017 | Kim | B64D 43/00 |

OTHER PUBLICATIONS

Extended EP Search Report for Application No. 18169682.4 dated Dec. 4, 2018.

* cited by examiner

SYSTEM AND METHOD FOR DETERMINING DIVERSION AIRPORTS FOR LANDING IN ADVERSE CONDITIONS

TECHNICAL FIELD

The exemplary embodiments described herein generally relate to flight planning for aircraft navigation information and more particularly to identifying and determining the best probability of landing at diversion airports in adverse conditions.

BACKGROUND

Prudent flight planning includes considering the potential need to land at alternate airports. An aircraft may need to land at an alternate airport due to poor en route or destination weather, destination abnormalities, aircraft anomalies, or passenger sickness. Weather or destination abnormalities can be the most frequent causes for landing at an alternate airport. According to the latest research on flight delays reported by FAA and Euro control, weather delays are responsible for 70 percent of commercial air travel delays in both US and European airspace. It is difficult for the pilots to predetermine landing at the alternate airport in adverse conditions unless it is close to the planned destination. Flight crew workload at these times is typically quite high, so having an assistant or automation help with the selection of the best alternate airport from a continuously updated list would be very beneficial. For example, aircraft may circle over an airport for an extended period of time waiting for the severe weather to disperse. In these cases, the aircraft may have to eventually divert to another airport when its fuel runs low.

It is desirable for pilots to predetermine if they can land at alternate airports during the flight when the flight arrives at some position or enters some area. This reduces unnecessary fuel burn from circling at the destination airport when the destination airport is not suitable to land, avoiding inefficient approach on the planned destination and then flying to the alternate airport under adverse conditions, alleviating long flight delays brought by predictable abnormalities, and earlier notice to the ground for better passenger service.

While datalinks between aircraft and ground-based systems exist for communicating updated weather conditions and other information, performing complex data analytics and modeling on the aircraft would require transmission of significant quantities of information to the aircraft. Furthermore, it may be difficult for the aircraft to get timely access to the multiple data channels necessary to perform these calculations. Accordingly, it may not be desirable to devote significant aircraft computational resources and bandwidth to these type of calculations.

Accordingly, it is desirable to provide a system and method for identifying and determining the best probability of landing at diversion airports in adverse conditions. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

In an exemplary embodiment, a system for determining diversion airports for landing an aircraft in adverse conditions includes a communication device on the aircraft configured to facilitate the transmission and display of flight information. A ground based monitoring server (GBMS) is configured to communicate with the communication device on the aircraft over a wireless communication channel. The GBMS further includes an aircraft flight parameter database including a plurality of aircraft flight parameters associated with the aircraft. The GBMS further includes an airport parameter database including airport parameters for a destination airport and a plurality of diversion airports. The GBMS further includes an airport weather database including airport weather parameters associated with the destination airport and each of the plurality of diversion airports. The GBMS further includes a diversion landing prediction assistance system (DLPAS) configured to communicate with and query the aircraft flight parameter database, the airport parameter database, and the airport weather database. The DLPAS is further configured to monitor the aircraft flight parameters, the destination airport parameters, and the destination airport weather parameters, determine a destination probability of the aircraft to land at the destination airport based on the monitored parameters, and when the destination probability for a successful landing is less than a predetermined destination threshold, select a diversion airport to land the aircraft. The GBMS is further configured to transmit the selected diversion airport to the communication device.

In an exemplary embodiment, a method for determining diversion airports for landing an aircraft in adverse conditions includes monitoring, with a diversion landing prediction assistance system (DLPAS) on a ground based monitoring server (GBMS), aircraft flight parameters from an aircraft flight parameter database, the aircraft flight parameters including a plurality of aircraft flight parameters associated with the aircraft. The method further includes monitoring, with the DLPAS, destination airport parameters from an airport parameter database, the airport parameter database including airport parameters for a destination airport and a plurality of diversion airports. The method further includes monitoring, with the DLPAS, airport weather parameters from an airport weather database, the airport weather database including airport weather parameters associated with the destination airport and each of the plurality of diversion airports. The method further includes determining, with the DLPAS, a destination probability of the aircraft to land at the destination airport based on the monitored parameters. The method further includes comparing, with the DLPAS, the destination probability for a successful landing to a predetermined destination threshold. The method further includes selecting, with the DLPAS, a diversion airport to land the aircraft when the destination probability for a successful landing is less than the predetermined destination threshold. The method further includes transmitting, with the GBMS, the selected diversion airport to communication device on the aircraft and displaying the selected diversion airport.

BRIEF DESCRIPTION OF THE DRAWINGS

The present invention will hereinafter be described in conjunction with the following drawing figures, wherein like numerals denote like elements.

DETAILED DESCRIPTION

Figure 1:
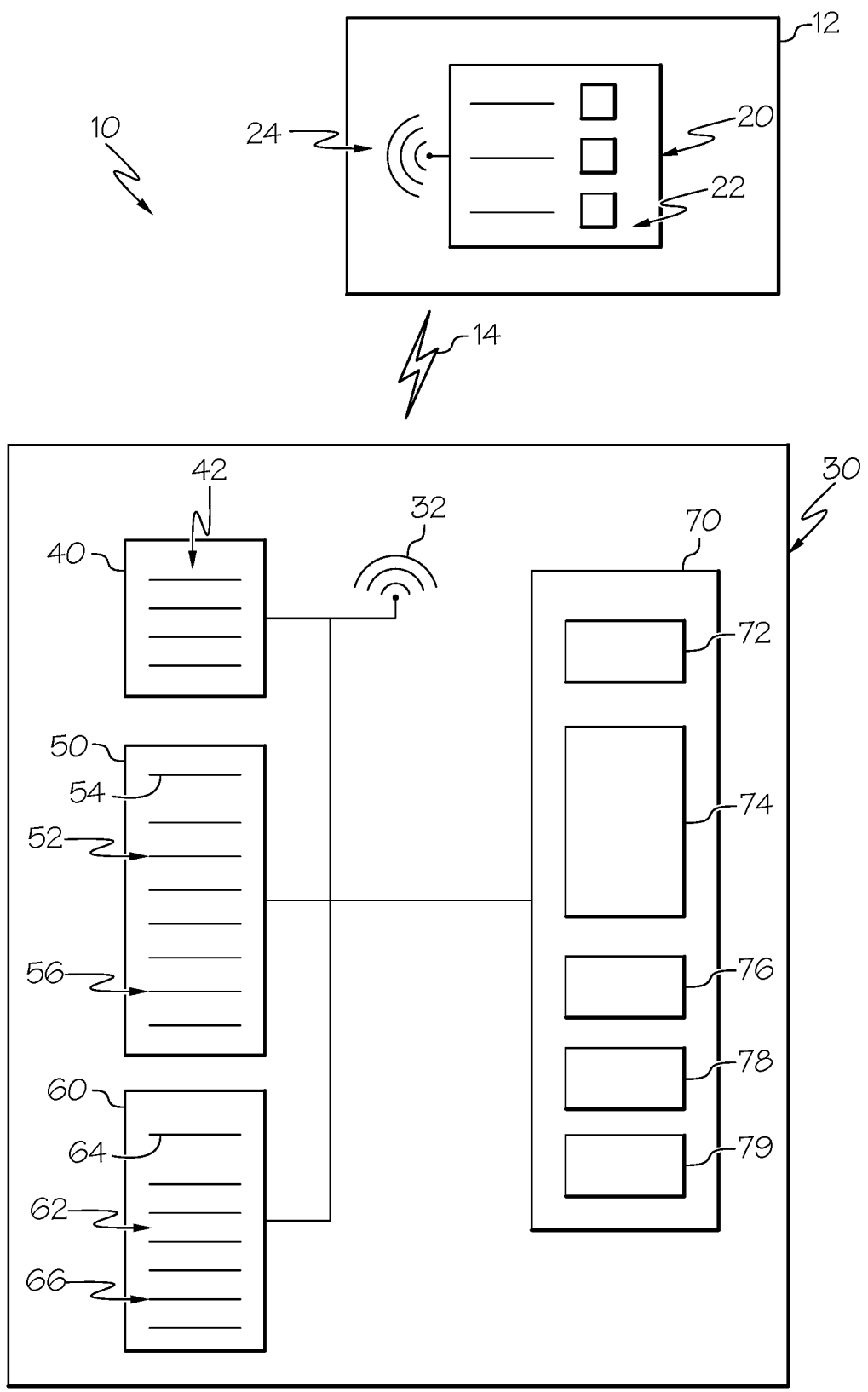
FIG. 1 is a block diagram of an exemplary system for determining diversion airports for landing an aircraft in adverse conditions.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Any of the above devices are exemplary, non-limiting examples of a computer readable storage medium In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

With reference now to FIG. 1, a system 10 for determining diversion airports for landing an aircraft 12 in adverse conditions is shown herein. The system 10 is generally implemented in the aircraft 12, however, in a non-limiting embodiment, the system 10 is implemented in other vehicles including, helicopters, and the like. The system 10 includes a communication device 20 on the aircraft 12 and a ground based monitoring server (GBMS) 30 remote from the aircraft 12. The communication device 20 and GBMS 30 are in communication over a wireless communication channel 14.

The communication device 20 is configured to facilitate the displaying of flight information 22 to a pilot or cabin crew of the aircraft 12. In a non-limiting embodiment, the communication device 20 includes a transceiver 22 configured to send and receive information over the wireless communication channel 14. In a non-limiting example, the communication device 20 is in communication with other various systems on the aircraft 12 (not shown) via a bus such that the communication over the wireless communication channel 14 is conducted by another aircraft system.

In a non-limiting embodiment, the communication device 20 is part of an aircraft communications, addressing, and reporting system (ACARS). An ACARS is a digital data link system for the transmission of messages between aircraft 12 and ground stations such as the GBMS 30. The communication device 20 functions as a router for all data transmitted or received externally, and, in more advanced systems, internally as well. With respect to the present system 10, the communication device 20 routes data transmitted between the aircraft 12 and the GBMS 30 and is further configured to facilitate the displaying of flight information 22 to the pilot or cabin crew.

The GBMS 30 is remote from the aircraft 12 and allows for information gathering and computation to be performed by the GBMS 30. The GBMS 30 includes an aircraft flight parameter database 40 including a plurality of aircraft flight parameters 42 associated with the aircraft 12. The GBMS 30 further includes an airport parameter database 50 including airport parameters 52 for a destination airport 54 and a plurality of diversion airports 56. The GBMS 30 further includes an airport weather database 60 including airport weather parameters 62 associated with the destination airport 64 and each of the plurality of diversion airports 66. The GBMS 30 further includes a diversion landing prediction assistance system 70 (DLPAS) that is configured to communicate with and query the aircraft flight parameter database 40, the airport parameter database 50, and the airport weather database 60. In a non-limiting embodiment, the GBMS 30 further includes a transceiver configured to send and receive information over the wireless communication channel 14.

The term "server," as used herein, generally refers to an electronic component, as is known to those skilled in the art, such as a computer program or a machine that waits for requests from other machines or software (clients) and responds to them. In a non-limiting example, the GBMS 30 communicates the aircraft 12 over the wireless communication channel 14.

The aircraft flight parameter database 40 includes a plurality of aircraft flight parameters 42 associated with the aircraft 12. While only a limited number of aircraft flight parameters 42 are shown in aircraft flight parameter database 40 for simplicity, one skilled in the art will understand that any number of aircraft flight parameters 42 may be stored in the aircraft flight parameter database 40. The aircraft flight parameter database 40 may also be regularly updated to ensure that the aircraft flight parameters 42 are current and accurate.

The aircraft flight parameters 42 are associated with specific aircraft 12. In a non-limiting embodiment, the aircraft flight parameters 42 include at least one of a lowest fuel burn mode, a best landing criteria mode, a ceiling requirement, a visibility requirement, a runway requirement, a flight plan, aircraft position, fuel quantity or a combination thereof. Each set of aircraft flight parameters 42 are unique to a specific aircraft 12 and describe how the aircraft 12 performs and also requirements necessary for the aircraft 12 to use a specific airport. For example, the aircraft flight parameter 42 relating to the lowest fuel burn mode of the aircraft 12 describes the lowest rate of fuel that the aircraft 12 can burn while flying. One skilled in the art will appreciate that different aircraft 12 will have different aircraft flight parameters 42 based in part on the aircraft's 12 size, engine configuration, model, takeoff weight, et cetera, and that the aircraft flight parameters 42 are unique to each aircraft 12. The aircraft flight parameters 42 stored in the aircraft flight parameter database 40 are accessible by the DLPAS 70.

The airport parameter database 50 includes airport parameters 52 for a destination airport 54 and a plurality of diversion airports 56. While only a limited number of airport parameters 52 are shown in airport parameter database 50 for simplicity, one skilled in the art will understand that any number of airport parameters 52 may be stored in the airport parameter database 50. The airport parameter database 50 may also be regularly updated to ensure that the airport parameters 52 are current and accurate.

The airport parameters 52 include destination airport parameters 54 and a plurality of diversion airport parameters 56. In a non-limiting embodiment, the airport parameters 52 include at least one of a runway length, an airport location, runway direction, surface wind, airport support facilities such as medical service location, or a combination thereof. Each set of airport parameters 52 are unique to a specific airport and describe, in part, the specifications of the airport. For example, the airport parameter 52 may describe the dimensions of a runway or a list of aircraft 12 that can land at the airport. One skilled in the art will appreciate that different airports will have different airport parameters 52 such that certain aircraft 12 may not be able to land at the airport. The airport parameters 52 stored in the airport parameter database 50 are accessible by the DLPAS 70.

The airport weather database 60 includes airport weather parameters 62 associated with the destination airport 64 and the plurality of diversion airports 66. While only a limited number of airport weather parameters 62 are shown in airport weather database 60 for simplicity, one skilled in the art will understand that any number of airport weather parameters 62 may be stored in the airport weather database 60. The airport weather database 60 may also be regularly updated to ensure that the airport weather parameters 52 are current and accurate.

In a non-limiting embodiment, the GBMS 30 is configured to update the airport weather database 60 with updated weather parameters from at least one of a short-range weather service, a long-range weather service, an airport observation service, a satellite weather service, an aircraft observation service, or a combination thereof. In a non-limiting embodiment, the GBMS 30 acquires the updated weather parameters through an Internet connection or from a wireless weather provider. The GBMS 30 then updates the airport weather database 60 with the updated parameters such that recent airport weather parameters 62 are available to the DLPAS 70.

The airport weather parameters 62 include destination airport weather parameters 64 and a plurality of diversion airport weather parameters 66. In a non-limiting embodiment, the airport parameters 52 include at least one of a diversion airport ceiling, a diversion airport visibility, a diversion airport runway visual range, a diversion airport wind condition, temperature, or a combination thereof. Each set of airport weather parameters 62 are unique to a specific airport and describe, in part, the weather conditions of the airport. For example, the airport weather parameter 62 may describe the current or predicted weather conditions at the airport. One skilled in the art will appreciate that different airports will have different airport weather parameters 62 such that certain aircraft 12 may not be able to land at the airport due to adverse weather conditions. The airport weather parameters 62 stored in the airport weather database 60 are accessible by the DLPAS 70.

The DLPAS 70 is configured to communicate with and query the aircraft flight parameter database 40, the airport parameter database 50, and the airport weather database 60. The DLPAS monitors the aircraft flight parameters 42, the destination airport parameters 54, and the destination airport weather parameters 64. As the DLPAS 70 monitors these parameters, the DLPAS 70 determines a destination probability 72 of the aircraft 12 to land at the destination airport based on the monitored parameters. When the destination probability 72 for a successful landing is less than a predetermined destination threshold, the DLPAS 70 selects a diversion airport to land the aircraft 12.

In a non-limiting example, the DLPAS 70 obtains aircraft flight parameters 42 from the aircraft flight parameter database 40 relating to the specific aircraft 12. As detailed above, the aircraft flight parameters 42 provide the DLPAS 70 with the information about the aircraft 12 that are necessary to both monitor and model how the aircraft 12 will perform, the aircraft's landing requirements, the aircraft's flight plan, and the like.

The DLPAS 70 also obtains destination airport parameters 54 from the airport parameter database 50 relating to the destination airport from the aircraft's 12 flight plan. As detailed above, the destination airport parameters 54 provide the DLPAS 70 with the information about destination airport such as a runway length, an airport location, a runway direction, surface wind, airport support facilities. As will be explained later, the destination airport parameters 54 may be used to identify a diversion airport to land the aircraft 12, should one be needed.

The DLPAS 70 also obtains destination airport weather parameters 64 from the airport weather database 60 relating to weather conditions at the destination airport from the aircraft's 12 flight plan. As detailed above, the destination airport weather parameters 64 provide the DLPAS 70 with the information about destination airport's weather conditions such as wind speed, visible ceiling, and the like.

As the DLPAS 70 monitors the aircraft flight parameters 42, destination airport parameters 54, and destination airport weather parameters 64, the DLPAS 70 determines the destination probability 72 for a successful landing. In a non-limiting example, the destination probability 72 for a successful landing describes the probability that the aircraft 12 will be able to land at the destination airport. Each aircraft 12 has aircraft flight parameters 42 that detail minimum criteria to land at the destination airport while the destination airport parameters 54 and destination airport weather parameters 64 detail the landing conditions at the destination airport. The destination probability 72 for a successful landing is a numerical expression of the likelihood that the aircraft 12 will be able to land at the destination airport. By way of example, high winds, poor visibility, or limited fuel reserves may decrease the destination probability 72 for a successful landing while calm winds, substantial fuel reserves, and the aircraft's 12 proximity to the destination airport may increase the destination probability 72 for a successful landing. In a non-limiting embodiment, the destination probability 72 for a successful landing is determined using a lookup table 74 that associates destination probabilities 72 with specific combinations of the aircraft flight parameters 42, destination airport parameters 54, and destination airport weather parameters 64.

The DLPAS 70 compares the destination probability 72 for a successful landing to a predetermined destination threshold 76. The predetermined destination threshold 76 is set based on design considerations of the system 10. The threshold is a defined constant and can be adjusted based on user preference.

When the destination probability 72 for a successful landing is less than the predetermined destination threshold 76, the DLPAS 70 is configured to select a diversion airport to land the aircraft 12. In this way, when the destination probability 72 that the aircraft 12 will land at the destination airport is sufficiently low, that is less than the destination threshold 76, the DLPAS 70 selects a diversion airport to land the aircraft 12. One skilled in the art will appreciate that relationship between the destination probability 72 for a successful landing and the destination threshold 76 may be reversed without departing from the spirit of the application. For example, the destination probability 72 for a successful landing may be a measure of the likelihood that the aircraft 12 will not be able to land at the destination airport. In this example, the destination probability 72 for a successful landing may increase as weather conditions at the destination airport deteriorate. In this situation, the DLPAS 70 may select a diversion airport to land the aircraft 12 when the destination probability 72 for a successful landing is greater than the destination threshold 76.

When the DLPAS 70 selects the diversion airport to land the aircraft 12, the GBMS 30 transmits the selected diversion airport to the communication device 20 on the aircraft 12. The communication device 20 may facilitate the displaying of the selected diversion airport directly to the pilot or flight crew, or the communication device 20 may distribute the selected diversion airport to another aircraft system (not shown) to convey the information to the pilot or flight crew.

In this way, the system 10 monitors the aircraft flight parameters 42, destination airport parameters 54, and destination airport weather parameters 64 to determine the destination probability 72 for a successful landing that the aircraft 12 will land at the destination airport. When the destination probability 72 for a successful landing is less than the destination threshold 76, the DLPAS 70 selects a diversion airport and transmits the selected diversion airport to the communication device 20. This is turn provides the flight crew of the aircraft with a diversion airport to land the aircraft 12 and take the appropriate action.

Accordingly, all of the data acquisition, modeling, and prediction is handled by the GBMS 30 on the ground rather than in the air onboard the aircraft 12. One skilled in the art will appreciate that it is more cost effective to perform data heavy computations with the GBMS 30 rather than onboard the aircraft 12. Furthermore, the GBMS 30 can more easily access the large amount of data contained in the airport parameter database 50 and the airport weather database 60 than the aircraft 12. All of the information in the airport parameter database 50 and the airport weather database 60 would either need to be transmitted to the aircraft 12 or the information would need to be transmitted based on queries from the aircraft 12. With the system 10, only the selected diversion airport is transmitted to the communication device 20 which greatly reduces the computational burden on the aircraft and reduces the amount of data that needs to be transmitted over the wireless communication channel 14 which in turn makes the data transmission more reliable.

The components of the system 10 have been shown as discrete blocks in the representation of FIG. 1 to aid in understanding how the system 10 determines a diversion airport to land the aircraft 12. However, one skilled in the art will appreciate that the components of the GBMS 30 may be combined with one another in various forms without departing from the spirit of the present disclosure.

In a non-limiting embodiment of the system 10, GBMS 30 is configured to update the airport weather database 60 with updated weather parameters from at least one of a short-range weather service, a long-range weather service, an airport observation service, a satellite weather service, an aircraft observation service, or a combination thereof. The GBMS 30 may perform this update based upon a timer or as new weather information becomes available. In a non-limiting embodiment, the updated weather parameters may be pushed to the GBMS 30 automatically as they become available. As detailed above, the GBMS 30, by nature of being static and, preferably, having wired data connections to other ground based systems and weather services, can more easily obtain undated weather parameters when compared to the aircraft 12.

In a non-limiting embodiment, the GBMS 30 is further configured to transmit the plurality of identified diversion airports to the communication device 20. Rather than only transmitting the selected diversion airport to the communication device 20, the GBMS 30 transmits all of the identified diversion airports to the communication device 20 so that the flight crew may be provided with more information and make the selection.

In a non-limiting embodiment, the DLPAS 70 is further configured to identify a plurality of diversion airports to land the aircraft 12. The DLPAS 70 determines a diversion airport probability 78 for each of the identified diversion airports and selects the diversion airport to land the aircraft 12 based on the diversion airport probability 78. In a non-limiting example, the DLPAS 70 identifies the plurality of diversion airports that could each potentially serve as the diversion airport to land the aircraft 12. The DLPAS 70 determines diversion airport probability 78 for each of the identified diversion airports based upon the diversion airport parameters 56 including at least one of a runway length, an airport location, runway direction, surface wind, airport support facilities, or a combination thereof. The diversion airport probability 78 is a weighted measure of the suitability of the airport for landing the aircraft. For example, airport A may be closer to the aircraft 12 than airport B, but airport B may have a higher diversion airport probability 78 due to better weather conditions.

In a non-limiting embodiment, the DLPAS 70 selects the diversion airport when the diversion airport probability 78 is greater than or equal to a predetermined diversion threshold 79. Similar to the destination threshold 76, the diversion threshold 79 is set based on design considerations of the system 10.

In a non-limiting embodiment, the DLPAS 70 identifies the plurality of diversion airports to land the aircraft 12 based upon a current position of the aircraft 12. In a non-limiting example, the DLPAS 70 may more heavily weight the proximity of the diversion airport to the aircraft 12 when identifying the diversion airports. All diversion airports within a set radius of the aircraft 12 may be selected which may be particularly useful when the aircraft's 12 fuel is low or in the case of an emergency.

In a non-limiting embodiment, the DLPAS 70 filters the identified diversion airports based on the aircraft flight parameters 42. The aircraft flight parameters may include at least one of a lowest fuel burn mode, a best landing criteria mode, a ceiling requirement, a visibility requirement, a runway requirement, a flight plan, or a combination thereof. In this way, the DLPAS 70 excludes diversion airports that do not meet criteria necessary to land the aircraft 12 or those that are outside the aircraft's 12 flight range.

In a non-limiting embodiment, the DLPAS 70 filters the identified diversion airports based on the airport parameters 52. The airport parameters may include at least one of a runway length, an airport location, runway direction, surface wind, airport support facilities, or a combination thereof. In this way, the DLPAS 70 further excludes diversion airports that are not viable candidates to land the aircraft 12.

In a non-limiting embodiment, the DLPAS 70 filters the identified diversion airports based on the diversion airport weather parameters 66. The diversion airport weather parameters 66 include at least one of a diversion airport ceiling, a diversion airport visibility, a diversion airport runway visual range, a diversion airport wind condition, or a combination thereof. In this way, the DLPAS 70 further excludes diversion airports.

It should be understood that FIG. 1 is a simplified representation of a system 10 for purposes of explanation and ease of description, and FIG. 1 is not intended to limit the application or scope of the subject matter in any way. In practice, the system 10 and/or aircraft 12 will include numerous other devices and components for providing additional functions and features, as will be appreciated in the art.

Figure 2:
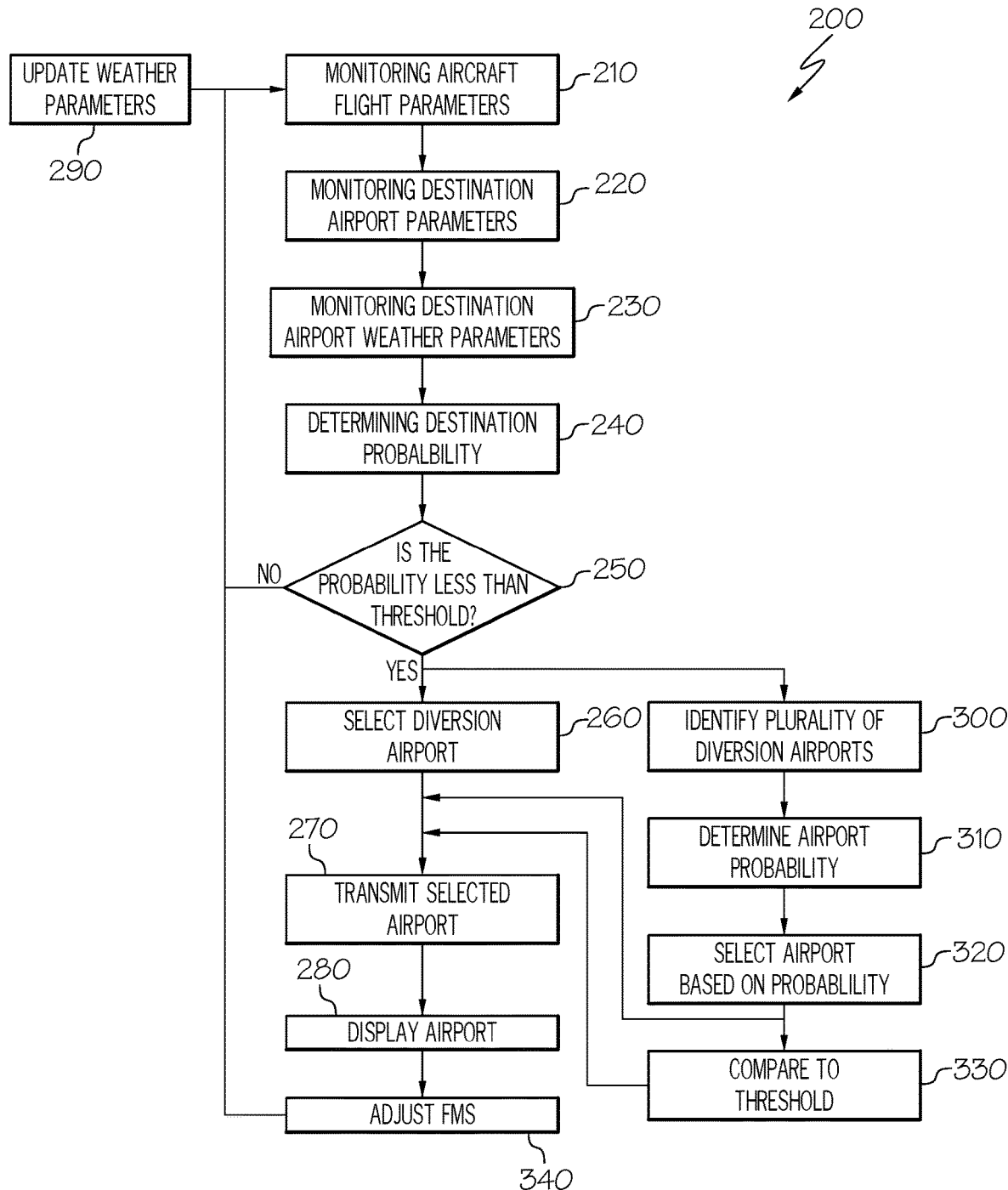
FIG. 2 is a flow diagram of an exemplary method suitable for use with the system of FIG. 1 in accordance with the exemplary embodiments.

With reference now to FIG. 2, and with continued reference to FIG. 1, a flowchart illustrates a method 200 performed by the system 10 of FIG. 1 in accordance with the present disclosure. As can be appreciated in light of the disclosure, the order of operation within the method 200 is not limited to the sequential execution as illustrated in FIG. 2, but may be performed in one or more varying orders as applicable and in accordance with the requirements of a given application.

In various exemplary embodiments, the system 10 and method 200 are operated based on predetermined events, such as the aircraft 12 taking off from an airport. Method 200 may be performed by the system 10 or may be performed by any other suitable device or system configured in a manner consistent with the teachings of the present disclosure. Unless otherwise noted, the method 200 may be performed by any of the embodiments of the system 10 previously described above.

The method 200 starts at block 210 monitoring aircraft flight parameters from an aircraft flight parameter database. In a non-limiting embodiment, a diversion landing prediction assistance system 70 (DLPAS) on a ground based monitoring server 30 (GBMS) monitors aircraft flight parameters 42 from an aircraft flight parameter database 40 including a plurality of aircraft flight parameters 42 associated with the aircraft 12. At block 220, the method 200 monitors destination airport parameters from an airport parameter database. In a non-limiting embodiment, the DLPAS 70 monitors destination airport parameters 54 from an airport parameter database 50 including airport parameters for a destination airport and a plurality of diversion airports 56.

At block 230, the method 200 monitors airport weather parameters from an airport weather database. In a non-limiting embodiment, the DLPAS 70 monitors airport weather parameters 62 from an airport weather database 60 including airport weather parameters associated with the destination airport 64 and each of the plurality of diversion airports 66. At block 240, the method 200 determines a destination probability of the aircraft to land at the destination airport based on the monitored parameters. In a non-limiting embodiment, the DLPAS 70 determines a destination probability 72 of the aircraft 12 to land at the destination airport based on the monitored parameters 42, 54, 64.

At block 250, the method 200 compares the destination probability for a successful landing to a predetermined destination threshold. In a non-limiting embodiment, the DLPAS 70 compares the destination probability 72 for a successful landing to a predetermined destination threshold 76. At block 260, the method 200 selects a diversion airport to land the aircraft when the destination probability for a successful landing is less than the predetermined destination threshold. In a non-limiting embodiment, the DLPAS 70 selects a diversion airport to land the aircraft 12 when the destination probability 72 for a successful landing is less than the predetermined destination threshold 76.

At block 270, the method 200 transmits the selected diversion airport to a communication management unit (communication device) on the aircraft. In a non-limiting embodiment, the GBMS 30 transmits the selected diversion airport to the communication device 20 on the aircraft 12. At block 280, the method 200 displays the selected diversion airport. In a non-limiting embodiment, the communication device 20 facilitates the displaying of the selected diversion airport. From block 280, the method 200 returns to block 110 and continues to monitor the aircraft flight parameters. In this way, the method 200 determines diversion airports for landing an aircraft in adverse conditions.

In a non-limiting embodiment, the method 200 further includes block 290 and updates the airport weather database with updated weather parameters from at least one of a short-range weather service, a long-range weather service, an airport observation service, a satellite weather service, an aircraft observation service, or a combination thereof. In a non-limiting embodiment, the GBMS 30 updates the airport weather database 60 with updated weather parameters from at least one of a short-range weather service, a long-range weather service, an airport observation service, a satellite weather service, an aircraft observation service, or a combination thereof.

In a non-limiting embodiment, the method 200 further includes block 300 and identifies a plurality of diversion airports to land the aircraft. In a non-limiting embodiment, the DLPAS 70 identifies a plurality of diversion airports to land the aircraft 12. At block 310, the method 200 determines a diversion airport probability for each of the identified diversion airports. In a non-limiting embodiment, the DLPAS 70 determines a diversion airport probability 78 for each of the identified diversion airports. At block 320, the method 200 selects the diversion airport to land the aircraft based on the diversion airport probability. In a non-limiting embodiment, the DLPAS 70 selects the diversion airport to land the aircraft 12 based on the diversion airport probability 78.

In a non-limiting embodiment, the method 200 includes block 330 and selects the diversion airport when the diversion airport probability is greater than or equal to a predetermined diversion threshold. In a non-limiting embodiment, the DLPAS 70 selects the diversion airport when the diversion airport probability 78 is greater than or equal to the predetermined diversion threshold 79.

In a non-limiting embodiment, the method 200 includes block 340 and adjusts a flight management system (FMS) destination based on the selected diversion airport. In a non-limiting embodiment, an FMS destination on the aircraft 12 is adjusted based on the selected diversion airport.

Figure 3:
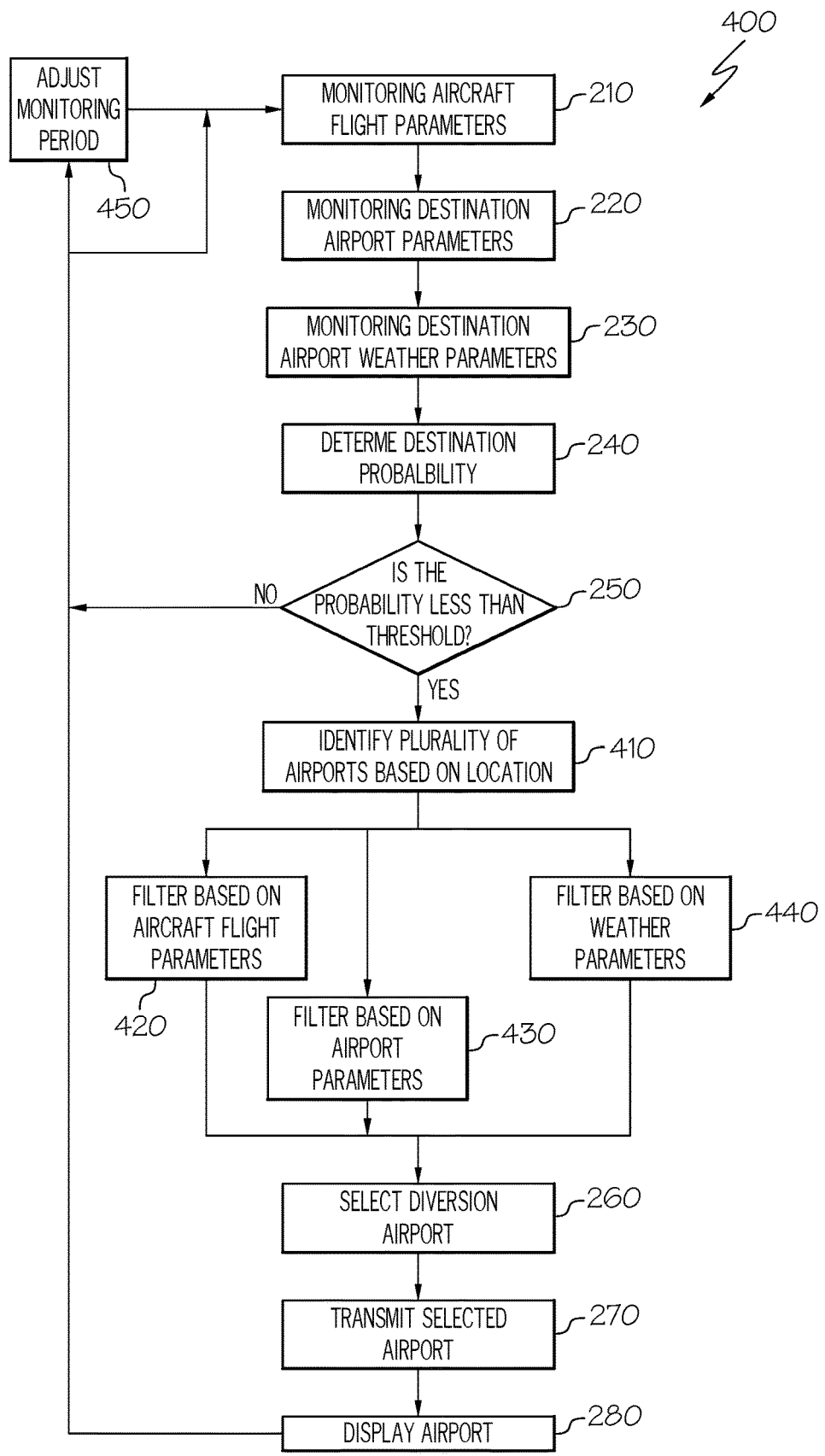
FIG. 3 is a flow diagram of an exemplary method suitable for use with the system of FIG. 1 in accordance with another embodiment.

With reference now to FIG. 3, and with continued reference to FIGS. 1 and 2, a flowchart illustrates a method 400 performed by the system 10 of FIG. 1 in accordance with the present disclosure. As can be appreciated in light of the disclosure, the order of operation within the method 400 is not limited to the sequential execution as illustrated in FIG. 3, but may be performed in one or more varying orders as applicable and in accordance with the requirements of a given application. As method 400 contains similar blocks to method 200, similar reference numerals will be used where appropriate and the description of method 400 will focus on the differences relative to method 200.

In a non-limiting embodiment, the method 400 includes block 410 and identifies the plurality of diversion airports to land the aircraft based upon a current position of the aircraft. In a non-limiting embodiment, the DLPAS 70 identifies the plurality of diversion airports to land the aircraft 12 based upon a current position of the aircraft 12. At block 420, the method 400 filters the identified diversion airports based on the aircraft flight parameters, the aircraft flight parameters including at least one of a lowest fuel burn mode, a best landing criteria mode, a ceiling requirement, a visibility requirement, a runway requirement, a flight plan, or a combination thereof. In a non-limiting embodiment, the DLPAS 70 filters the identified diversion airports based on the aircraft flight parameters 42, the aircraft flight parameters including at least one of a lowest fuel burn mode, a best landing criteria mode, a ceiling requirement, a visibility requirement, a runway requirement, a flight plan, or a combination thereof.

In a non-limiting embodiment, method 400 includes block 430 and filters the identified diversion airports based on the airport parameters, the airport parameters including at least one of a runway length, an airport location, a runway direction, surface wind, airport support facilities, or a combination thereof. In a non-limiting embodiment, the DLPAS 70 filters the identified diversion airports based on the airport parameters 52, the airport parameters including at least one of a runway length, an airport location, runway direction, surface wind, airport support facilities, or a combination thereof.

In a non-limiting embodiment, method 400 includes block 440 and filters the identified diversion airports based on the diversion airport weather parameters, the diversion airport weather parameters including at least one of a diversion airport ceiling, a diversion airport visibility, a diversion airport runway visual range, a diversion airport wind condition, or a combination thereof. In a non-limiting embodiment, the DLPAS 70 filters the identified diversion airports based on the diversion airport weather parameters 66, the diversion airport weather parameters including at least one of a diversion airport ceiling, a diversion airport visibility, a diversion airport runway visual range, a diversion airport wind condition, or a combination thereof.

In a non-limiting embodiment, method 400 includes block 450 and adjusts a monitoring period of the DLPAS based on a distance between the current position of the aircraft and the destination airport. In a non-limiting embodiment, a monitoring period of the DLPAS 70 is adjusted based on a distance between the current position of the aircraft 112 and the destination airport.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A system, comprising:
a memory, the memory storing one or more software modules;
one or more processors configured to execute the one or more software modules, that when executed perform a method including:
monitoring flight parameters of an aircraft;
monitoring a first set of airport parameters of a destination airport and a first set of weather parameters associated with the destination airport;
monitoring a second set of airport parameters of a plurality of diversion airports and a second set of weather parameters associated with each of the plurality of diversion airports;
determining a destination probability, the destination probability comprising a probability of successfully landing the aircraft at the destination airport, the destination probability based on the flight parameters of the aircraft, the first set of airport parameters, and the first set of weather parameters;
in accordance with a determination that the destination probability of a successful landing is less than a predetermined destination threshold, selecting, and transmitting to the aircraft, a diversion airport to land the aircraft, the selected diversion airport selected from the plurality of diversion airports.

2. The system of claim 1, wherein the method further includes:
updating the weather parameters from at least one of a short-range weather service, a long-range weather service, an airport observation service, a satellite weather service, an aircraft observation service, or a combination thereof.

3. The system of claim 1, wherein the method further includes:
identifying a plurality of diversion airports to land the aircraft;
determining a diversion airport probability for each of the identified diversion airports, the diversion airport probability comprising a probability of successfully landing the aircraft at each of the identified diversion airports, the diversion airport probability based on the flight parameters of the aircraft, the second set of airport parameters, and the second set of weather parameters; and
selecting the diversion airport, from the plurality of diversion airports, to land the aircraft based on the diversion airport probability.

4. The system of claim 3, wherein the method further includes:
in accordance with a determination that a diversion airport probability is greater than or equal to a predetermined diversion threshold, selecting the diversion airport to land the aircraft.

5. The system of claim 3, wherein the method further includes:
identifying the plurality of diversion airports to land the aircraft based upon a current position of the aircraft.

6. The system of claim 3, wherein the method further includes:
transmitting the plurality of identified diversion airports to the aircraft.

7. The system of claim 6, wherein the method further includes:
prior to transmitting, filtering the identified diversion airports.

8. The system of claim 7, wherein the filtering is based on the flight parameters, the flight parameters including at least one of a lowest fuel burn mode, a best landing criteria mode, a ceiling requirement, a visibility requirement, a runway requirement, a flight plan, or a combination thereof.

9. The system of claim 7, wherein the filtering is based on the second set of airport parameters, the second set of airport parameters including at least one of a runway length, an airport location, runway direction, surface wind, airport support facilities, or a combination thereof.

10. The system of claim 7, wherein the filtering is based on the second set of weather parameters, the second set of weather parameters including at least one of a diversion airport ceiling, a diversion airport visibility, a diversion airport runway visual range, a diversion airport wind condition, or a combination thereof.

11. A method, comprising:
monitoring, by one or more processors, flight parameters of an aircraft;
monitoring, by the one or more processors, a first set of airport parameters of a destination airport and a first set of weather parameters associated with the destination airport;
monitoring, by the one or more processors, a second set of airport parameters of a plurality of diversion airports and a second set of weather parameters associated with each of the plurality of diversion airports;
determining, by the one or more processors, a destination probability, the destination probability comprising a probability of successfully landing the aircraft at the destination airport, the destination probability based on the flight parameters of the aircraft, the first set of airport parameters, and the first set of weather parameters;
in accordance with a determination that the destination probability of a successful landing is less than a predetermined destination threshold, selecting, and transmitting to the aircraft, by the one or more processors, a diversion airport to land the aircraft, the selected diversion airport selected from the plurality of diversion airports.

12. The method of claim 11, further comprising:
identifying, by the one or more processors, a plurality of diversion airports to land the aircraft;
determining, by the one or more processors, a diversion airport probability for each of the identified diversion airports, the diversion airport probability comprising a probability of successfully landing the aircraft at each of the identified diversion airports, the diversion airport probability based on flight parameters of the aircraft, the second set of airport parameters, and the second set of weather parameters; and
selecting, by the one or more processors, the diversion airport, from the plurality of diversion airports, to land the aircraft based on the diversion airport probability.

13. The method of claim 12, further comprising:
in accordance with a determination that a diversion airport probability is greater than or equal to a predetermined diversion threshold, selecting, by the one or more processors, the diversion airport to land the aircraft.

14. The method of claim 12, further comprising:
identifying, by the one or more processors, the plurality of diversion airports to land the aircraft based upon a current position of the aircraft.

15. The method of claim 12, further comprising:
transmitting, by the one or more processors, the plurality of identified diversion airports to the aircraft.

16. The method of claim 15, further comprising:
prior to transmitting, filtering, by the one or more processors, the identified diversion airports.

17. The method of claim 16, wherein the filtering is based on the flight parameters, the flight parameters including at least one of a lowest fuel burn mode, a best landing criteria mode, a ceiling requirement, a visibility requirement, a runway requirement, a flight plan, or a combination thereof.

18. The method of claim 16, wherein the filtering is based on the second set of airport parameters, the second set of airport parameters including at least one of a runway length, an airport location, runway direction, surface wind, airport support facilities, or a combination thereof.

19. The method of claim 16, wherein the filtering is based on the second set of weather parameters, the second set of weather parameters including at least one of a diversion airport ceiling, a diversion airport visibility, a diversion airport runway visual range, a diversion airport wind condition, or a combination thereof.

20. A system, comprising:
a memory, the memory storing one or more software modules;
one or more processors configured to execute the one or more software modules, that when executed perform a method including:
monitoring flight parameters of the aircraft;
monitoring a first set of airport parameters of a destination airport and a first set of weather parameters associated with the destination airport;
determining a destination probability, the destination probability comprising a probability of successfully landing the aircraft at the destination airport, the destination probability based on the flight parameters of the aircraft, the first set of airport parameters, and the first set of weather parameters;
in accordance with a determination that the destination probability of a successful landing is less than a predetermined destination threshold, identifying a plurality of diversion airports to land the aircraft;
monitoring a second set of airport parameters of each of the identified diversion airports and a second set of weather parameters associated with each of the identified diversion airports;
determining a diversion airport probability for each of the identified diversion airports, the diversion airport probability comprising a probability of successfully landing the aircraft at each of the identified diversion airports, the diversion airport probability based on flight parameters of the aircraft, the second set of airport parameters, and the second set of weather parameters; and
in accordance with a determination that the diversion airport probability for a diversion airport is greater than or equal to the predetermined diversion threshold, selecting, and transmitting to the aircraft, the diversion airport to land the aircraft, the selected diversion airport selected from the plurality of diversion airports.

* * * * *